United States Patent [19]
Martin

[11] 3,979,673
[45] Sept. 7, 1976

[54] RADIATING TELECOMMUNICATION SYSTEMS SWITCHING

[75] Inventor: David James Reginald Martin, Leatherhead, England

[73] Assignee: Coal Industry (Patents) Limited, London, England

[22] Filed: June 12, 1975

[21] Appl. No.: 586,245

[30] Foreign Application Priority Data
Aug. 7, 1974  United Kingdom............... 34806/74

[52] U.S. Cl. ...................................... 325/2; 325/4; 325/51
[51] Int. Cl.² ........................................... H04B 7/26
[58] Field of Search ................... 325/1, 2, 3, 4, 23, 325/51–54, 62; 179/82, 15 AL; 246/8, 63 C; 178/69 R, 69 A, 71 N

[56]      References Cited
         UNITED STATES PATENTS
2,980,793   4/1961   Daniel................................. 179/82
3,585,505   6/1971   Ogilvy................................... 325/51
3,750,020   7/1973   Baba et al............................ 325/51
3,916,311   10/1965  Martin................................. 325/53

*Primary Examiner*—Robert L. Griffin
*Assistant Examiner*—Jin F. Ng
*Attorney, Agent, or Firm*—James C. Wray

[57]            ABSTRACT

A telecommunication system uses a long main transmission line which extends from a base station and has repeaters along its length. A parallel line is divided into sections corresponding in length to the distance between repeaters. Selected sections are connected in parallel with the main line through switches which operate at about a 3 kHz frequency. The switching operation reduced alternations in the main signal and mitigates problems arising from standing waves.

8 Claims, 2 Drawing Figures

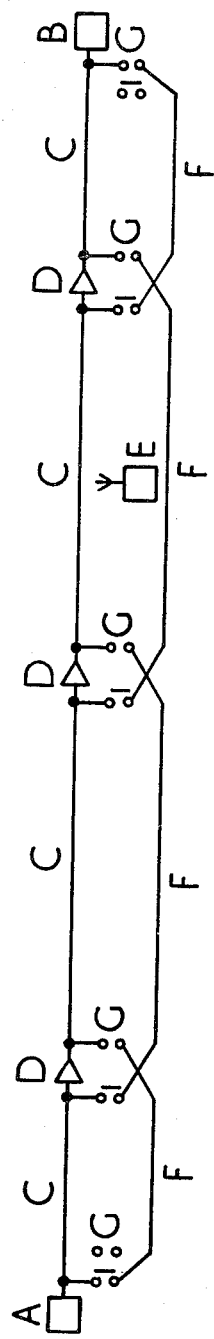
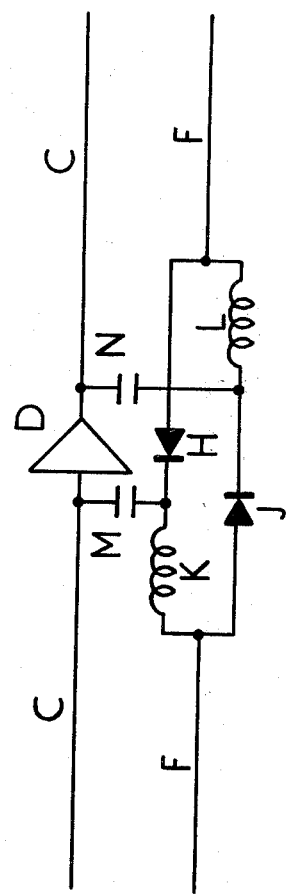

RADIATING TELECOMMUNICATION SYSTEMS SWITCHING

The present invention relates to a telecommunication system including a base station joined to a radiating transmission line having a plurality of repeaters spaced along its length and arranged to transmit signals to or receive signals from a mobile station in the vicinity of the line.

It is known that radio communication between a fixed and a mobile station may be obtained in a tunnel or mine or along any linearly designated route by installing a radiating or leaky transmission cable, which may conveniently take the form of a coaxial cable having a perforate or incomplete outer conductor along the route so to be served and connecting the leaky cable to the fixed base station in lieu of a normal aerial. Communication between the fixed and mobile stations then takes place through leakage fields around the cable. The longitudinal range of such systems in terms of the length of leaky cable which may usefully be connected to a base station is limited by the internal longitudinal attenuation in the cable, which results in a progressive weakening of the signals coupled between the fixed and mobile station as the length of line between them increases even through the leakage field relative to the energy within the cable at any point on the line is constant.

It is also known that this progressive weakening of the signal within the line can be compensated periodically by inserting amplifiers or repeaters in series with the leaky cable. For example, if the attenuation of the cable at the frequency used is 30 dB/km, then a repeater of gain equal to 30 dB may conveniently be inserted after every kilometer of cable. Where two-way communication is required, such repeaters may be two-way devices; alternatively, two-way communication may be achieved using a series or chain of simple one-way repeaters if the fixed base station is separated into its constituent transmitter and receiver and connected to opposite extremities of the leaky-cable system as described in British Pat. No. 1,371,291 and corresponding U.S. Pat. No. 3,916,311.

It is a remaining disadvantage of such systems that the strength of the signal transmitted between the fixed and mobile stations varies according to the position of the mobile station with respect to the nearest repeaters. In the example given above, for instance, the transmitted signal would vary by 30 dB, corresponding to the attenuation of a section of cable between adjacent repeaters. Ordinarily, such variation could only be reduced by spacing the repeaters at more frequent intervals and reducing the gain of each correspondingly.

It has been suggested that variation of signal may be reduced without reducing the repeater spacing by connecting a tailback or auxiliary length of leaky cable to the input connection or output connection, or to both, as appropriate and extending it in parallel with the main leaky cable, but in the opposite direction to the existing main cable from that point, for up to half the distance to the next repeater. In this manner the variation in transmitted signal as expressed in decibels and attributable to the position of the mobile station with respect to the repeaters may be halved in extent, for example from 30 dB to 15 dB.

Such a tailback arrangement, although of value, does not effectively reduce variations which may be additionally caused by standing-wave effects or multipath propagation in the vicinity of the mobile station, which variations may themselves exceed 20 dB in extent and may typically be experienced as sharply defined 'dropouts' or loss of communication in either or both directions at certain points in the vicinity of the cable. While such additional effects are not themselves directly related to the position of the mobile station with respect to the repeaters, their consequences are the most serious in the regions approximately midway between successive repeaters, that is in the regions where the general level of transmitted signal is weakest, when the tailback arrangement is used.

It is the object of the present invention to reduce such additional variations, especially in the regions approximately midway between successive repeaters.

According to the present invention a telecommunication system includes a base station joined to a main radiating transmission line having a plurality of repeaters spaced along its length and arranged to transmit signals to or receive signals from a mobile station in the vicinity of the line, a further length of radiating transmission line parallel to said main line and divided into sections substantially equivalent in length to the lengths of the main line between the base station and a first repeater or between repeaters and switching means adapted to connect different sections of the further line to lengths of the main line.

The switching means are preferably arranged to connect alternately said sections to an input or output of a repeater. The switching means may be a change over switch or it may comprise a solid state circuit including a pair of diodes connected for conduction in opposite directions.

In order that the invention may be readily understood one example of a telecommunications system in accordance therewith will now be described with reference to the two figures of the accompanying drawings in which:

FIG. 1 is a schematic circuit diagram of the system; and

FIG. 2 shows a circuit detail of a switch.

Referring now to FIG. 1, this shows how the insertions may advantageously be used in conjunction with the leaky-feeder radio frequency telecommunication system described in British patent specification No. 1,371,291 and corresponding U.S. Pat. No. 3,916,311. In this figure, a fixed transmitter A and a fixed receiver B are connected to opposite ends of a leaky cable C which acts as a radiating transmission line and which is divided into lengths by the insertion of one-way repeaters D each of which has a gain adequate to compensate for the transmission loss incurred in the preceding length of cable between repeaters. Communication from the fixed transmitter A to a mobile station E, and from the mobile station E to the fixed receiver B is achieved by the radiation of signal energy from the cable C. A and B are separately connected together by means not shown in order to complete the communication path as required. The arrangement as so far described constitutes the system as described in British patent specification No. 1,371,291 and corresponding U.S. Pat. No. 3,916,311.

An auxiliary leaky cable F is now installed parallel with the main leaky cable C and divided into sections substantially corresponding in length to the sections of n leaky cable between successive repeaters D. A -way switching means G is provided in association 1 each repeater D in such a manner that each sec-1 of auxiliary cable F may be connected either to the 1t of one or to the output of the other of two succes-: repeaters, such switching means being arranged to rate in phase with the other switching means and at apid rate, preferably higher than 3,000 complete :ching cycles per second in the case of speech comnication.

'uring the instants that the switches G are in the -hand position, the sections of auxiliary cable F are nected to the input circuits of their respective associed repeaters and thus form a tailback arrangement described in co-pending British patent application 34805/74 and corresponding co-pending U.s. pat application Ser. No. 586,280 filed June 12, 1975, operative in the direction of communication from bile station to transmitter base station B only. Simiy, during the instants that the switches are in the it-hand positions the cable sections are connected he output circuits of the repeaters and in this case n a tailback arrangement operative in the direction communication from transmitter base station A to bile station only. Notwithstanding that each of these pective connections is made for only part of the total e-cycle, typically 50% or less, the advantage of the back arrangement is substantially realised in both ctions of communication and the progressive varia-1 of transmitted signal between fixed and mobile ions in both directions according to the position of mobile station with respect to the repeaters is effec-:ly halved.

More importantly, the present invention also subntially reduces the localized variations in transmitsignal which result from standing-wave effects or ltipath propagation in the vicinity of the cables. :h variations are normally superimposed on the re progressive variations associated with the posi-1 of the mobile station with respect to the repeaters l it will be understood that their effect on the comnication is worst in the regions where the transmitsignal is already at a minimum with respect to the re progressive variations, that is midway between cessive repeaters in the case of a tailback arrangent or in the arrangement of FIG. 1. Referring again the arrangement illustrated in FIG. 1, it will be appciated that in circumstances when the fixed transter A is transmitting to the mobile station E posi-led in such a region midway between successive eaters, and when the switches G are in the left-hand ition so that each auxiliary cable section F is conted to the input of a repeater, then the useful signal h is entirely by way of the main cable C; the auxil-' cable F serves no useful function since the level of 1al transmitted through it is less than that transmitby the main cable to an extent equal to the gain of : repeater. The mobile station will then experience al signal variations associated with standing-wave :ct related to the main cable only.

1 the condition when the states of the switches G are ersed so that each length of auxiliary cable F is nnected instead to the output of a repeater D, the 1al transmitted from the fixed transmitter A to the bile station E in the same position as previously now ows two paths of equal average transmission loss, one as previously by way of the main cable only and other by way of one additional repeater and a section of auxiliary cable F. The signal by way of this second path reaches the vicinity of the mobile set E from the opposite direction to that of the main cable, and so the standing-wave pattern related to that path is in general different from that related to the main cable in that region even though the main cable and the auxiliary cable may be closely spaced and so virtually in the same position. Similarly, the standing-wave pattern resulting from the combination of the standing-wave patterns of both paths is in general different from that of the main cable acting alone.

If, now, the states of the switches G are continually changed at a rapid rate then the standing-wave pattern observed by the mobile station E, and in particular the precise location of any sharply defined drop-outs, will change in sympathy with the switching operation and the adverse effects of the local variations as experienced by the mobile station will be considerably reduced. In a similar manner it will be seen that when the mobile station E is transmitting to the fixed receiver B then the signal will be transmitted by one or two paths according to the states of the switches G, and similar considerations show that the effects of standing-wave variations in the vicinity of the mobile station are equally reduced in this direction of transmission.

In order to realise the advantages of the invention at the extremities of the leaky-cable system it is necessary as shown in FIG. 1 to halve the length of cable nearest each extremity and the extreme end sections of the auxiliary cable F are each connected alternately by the switching means G to opposite sides of the same repeater D in each case.

In a practical embodiment of the invention it is necessary to employ diode or solid-state electronic switching means at G, even though these have been depicted as mechanical switches for clarity in FIG. 1. A simplified diagrammatic representation of how such electronic switching may be effected is shown in FIG. 2, to which reference is now made and which shows the switching arrangement associated with one repeater. The connection of one or other of the two auxiliary cable sections F to the input or output of the repeater D is made by diode H or diode J respectively, made conducting by passage of a control current of suitable polarity along the auxiliary cable F. Radio frequency chokes K and L provide isolation for the radio frequencies used for the radio transmission while maintaining continuity for the control currents. Capacitors M and N allow the necessary radio-frequency connections to the input and output of the repeater while isolating the main and auxiliary cables for control and power-supply currents.

A control current in such an arrangement is conveniently an audio-frequency current at a frequency preferably above 3 kHz, in which case it will be appreciated that all switches in such a system would then change their state together upon reversal of the phase of the current.

I claim:

1. A telecommunication system comprising a base station, a main radiating transmission line connected at one end to the base station, a plurality of repeaters spaced along the length of the line and connected thereto, a further length of radiating transmission line parallel to the main line and divided into sections substantially equivalent in length to the lengths of the main line between the base station and a first repeater and between repeaters, and switching means associated with each repeater and the base station; the switching means being adapted to connect different sections of the further line to lengths of the main line.

2. A system according to claim 1 in which the switching means includes a pair of solid state diodes connected in parallel and in opposite directions of conduction.

3. A system according to claim 1, in which the repeaters are uni-directional.

4. A system according to claim 3 and including a further base station and associated switching means connected to the other end of the main line.

5. A system according to claim 1 in which all the switching means operate in phase with each other.

6. A system according to claim 5 in which the switching means operate at a frequency of 3,000 cycles per second or higher.

7. A system according to claim 1 in which the main line operates at a radio frequency and in which control signals at an audio frequency are used to operate the switching means.

8. A system according to claim 7 and including filter and isolating circuitry in the switching means.

* * * * *